(No Model.)
G. EASTMAN & P. H. YAWMAN.
ROLLER HOLDER FOR PHOTOGRAPHIC FILMS.
No. 433,774. Patented Aug. 5, 1890.
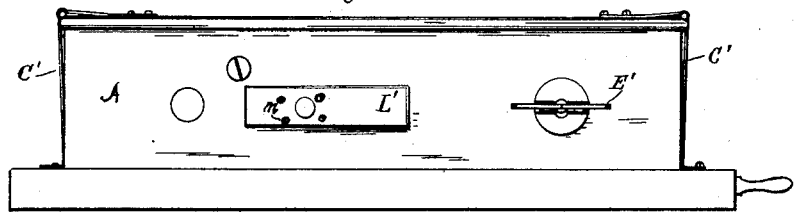
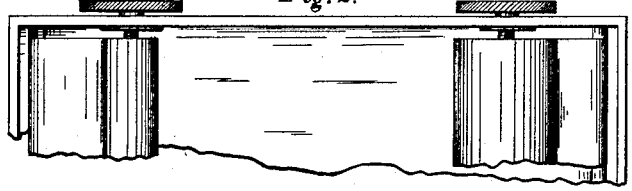
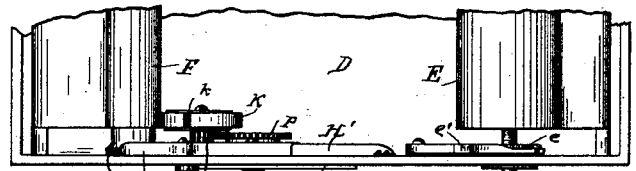
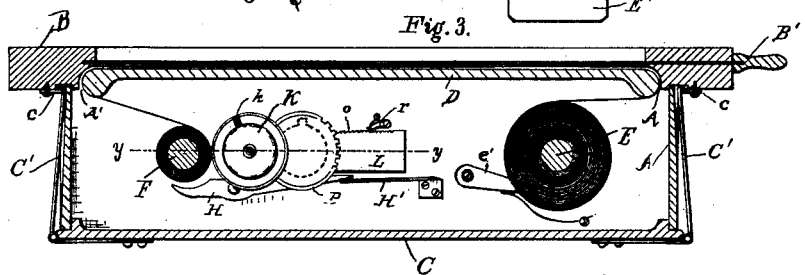
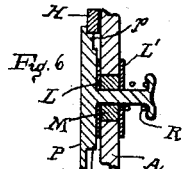
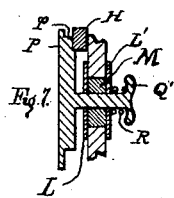
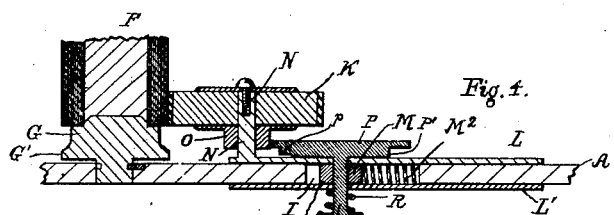
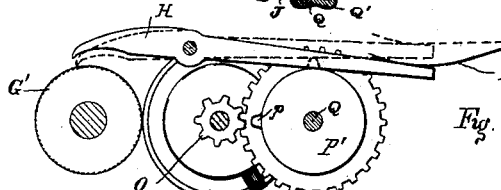
WITNESSES:
N. Y. Phillips
Thomas Durant
INVENTORS:
George Eastman and
Philip H. Yawman
BY
Church & Church
their ATTORNEYS

UNITED STATES PATENT OFFICE.

GEORGE EASTMAN AND PHILIP H. YAWMAN, OF ROCHESTER, NEW YORK, ASSIGNORS TO THE EASTMAN DRY PLATE AND FILM COMPANY, OF SAME PLACE.

ROLLER-HOLDER FOR PHOTOGRAPHIC FILMS.

SPECIFICATION forming part of Letters Patent No. 433,774, dated August 5, 1890.

Application filed April 19, 1889. Serial No. 307,639. (No model.)

*To all whom it may concern:*

Be it known that we, GEORGE EASTMAN and PHILIP H. YAWMAN, of the city of Rochester, county of Monroe, and State of New York, have invented certain new and useful Improvements in Roller-Holders for Photographic Films; and we do hereby declare the following to be a full, clear, and exact description of the same, reference being had to the accompanying drawings, forming a part of this specification, and to the letters of reference marked thereon.

Our invention relates to certain improvements in roller-holders for exposing in the camera flexible sensitized photographic film, and has for its object to so improve their construction and operation that not only will the film be properly measured and the points at which it is to be separated into negatives indicated, but all liability of the operator winding forward more than enough film for a single exposure is obviated; and to these ends it consists in certain novelties of construction and combinations of parts, all as will be hereinafter fully described, and the novel features pointed out in the claims at the end of this specification.

In the accompanying drawings, Figure 1 is a side view of a roller-holder constructed in accordance with our invention; Fig. 2, a rear view of the holder with the back removed; Fig. 3, a longitudinal sectional view; Fig. 4, a sectional view on the line $y\ y$ of Fig. 3; Fig. 5, a view of the measuring and marking wheel and connecting-gearing, the side of the casing being removed. Figs. 6 and 7 are sections through the cam operating the locking-lever, showing different positions of the lever.

Similar letters of reference in the several figures denote similar parts.

The letter A indicates the main casing of the holder, having the front B, in which is the exposing-aperture and the slide B' and the back C, said parts fitting together and rendering the holder light-tight, and being fastened together by means of the pivoted spring-catches C' C', mounted on the back and co-operating with suitable catch-plates $c$ $c$ on the front B, as ordinarily.

The film support or platen D, over which the film is drawn, is arranged at the front of casing A, and at the ends are slots A', through which the film passes to and from the winding devices, said support ends being rounded, as shown, to present smooth surfaces, over which the film can be drawn with little friction.

The winding-reel E is constructed as usual in this class of devices, being provided with a winding-key E', and a ratchet-wheel $e$ and pawl $e'$ for preventing backward rotation.

The supply or film spool F for containing the unexposed film is provided with the slotted end adapted to be entered by a rib on a disk G, mounted in the casing-wall, as usual, and said disk has attached to it a ratchet-wheel G', with which the end of a detent-lever H, pivoted to the casing A, engages at certain times, a spring H' operating on its extended end and serving to keep it out of engagement normally, so that the film can be wound forward by the rotation of the winding-reel.

Instead of marking the separate exposures of film by means of the measuring-roller, usually placed at the end of the film-support D, and relying upon the operator hearing the noise made by an audible indicating device to denote when a sufficient amount of film for an exposure has been wound forward, we propose to positively arrest and hold the winding mechanism until released by the operator, which we accomplish by the following mechanism:

The side of casing A, near the spool F, is provided with a slot I, in which is arranged a slide J, carrying the measuring-wheel K and the devices for causing the lever H to arrest the rotation of the spool at the proper times. The slide consists of two plates L L', the former arranged inside the casing and having a block or projection M thereon fitting the slot, and the latter on the outside, the two being connected by suitable screws $m$, as shown, said plates being longer than the slot, so that no portion of the slot will be uncovered, admitting light to the interior of the casing, even when the slide is at its extremes of movement. A spiral spring M² is arranged between the block M and the end of the slot, keeping the measuring-wheel in contact with the film on the spool at all times.

On the inside of the plate L is formed a stud N, on which measuring-wheel K is journaled, the latter projecting beyond the end of the plate and so arranged relative to the slot end that it will always be in contact with the film on the spool, and as the spring presses it tightly in contact any movement of the film will rotate the measuring-wheel, the surface of the latter traveling at the same speed as the film, no matter what the size of the spool may be, so that a suitable marker on the wheel will place marks or indications on the film, their distance apart being regulated by the size of the wheel.

For the purpose of preventing the slide from being moved back, carrying the measuring-wheel out of contact with the film, one side of the plate L is provided with ratchet-teeth o, with which co-operates a small spring-pawl r, sliding over the teeth when the slide is moved forward by its spring as the spool decreases in diameter. In the present construction we prefer to provide this wheel with a surface of some material—such as leather or rubber—which will not slip on the paper, and as a marking device, employ a small piece of felt or similar fibrous material k on the surface of the wheel, projecting slightly and saturated with a marking fluid or ink, so that as the film moves and the wheel is rotated this felt will touch the surface of the paper and leave a mark thereon. The circumference of this wheel may be such relative to the length of the exposing-aperture in the holder-front as to place these marks a distance apart equal to a single exposure, or it may be smaller, so that every third or fourth mark will indicate the place at which the film is to be cut to form the separate negatives, as in the roller-holder now in use.

In starting the operation of reeling the film forward the marker k on the measuring-wheel will be set at such a distance from the point where it comes in contact with the film that the mark will be made just back of the portion that was at the edge of the exposing-aperture in the front, and when once started properly the subsequent marks will come in their proper position, so that the operator can with safety sever the paper at the third or fourth mark, depending of course on the relation the circumference of the wheel bears to the length of the exposing-aperture.

On the side of the wheel K toward the casing is a small pinion O, having its teeth lengthened somewhat laterally, with which meshes a gear P on an arbor or spindle Q, journaled in the slide and projecting to the outside of the casing, as shown, where it is provided with a head or button Q', and said gear P, next the casing, is provided with a plain disk P', and at one point in its circumference with a pin or projection p. A spring R, preferably encircling arbor Q' and arranged between the head Q' and the slide, tends to draw the arbor outward and hold the disk P' or a corresponding spacing device against the inner side of the slide, though said arbor can be pushed back against the tension of the spring when desired, and when in normal position said disk is directly beneath the extended end of detent-lever H, the spring H' holding the latter upon it. The longitudinal movement permitted the arbor Q is sufficient to carry the projection p from beneath the end of the lever, and the lengthened teeth of pinion O (which, it will be noted, is smaller than the gear P) will keep the pinion and gear in mesh all the time.

When during the rotation of gear P, caused by the film being wound forward and rotating the wheel K, the projection p comes in contact with the under side of detent-lever H, it will raise the lever and cause its end to engage the ratchet-wheel G, connected to the spool, thereby arresting the rotation of the latter; but it may be released by pushing the arbor Q inward, causing said projection p to pass from under lever H, when the spring H' will return the latter to normal position on disk P', or a suitable stop provided for the purpose, the arbor and gear remaining moved inward and the projection p engaging the side of lever H, until by its further rotation it passes below, when the spring R will draw the arbor outward again to normal position, so that the projection will be in the path of the lever when it makes its next revolution. The relation between the length of the exposing-aperture, the wheel K, pinion O, and gear P is such that the latter will be given but a single rotation, carrying its projection p from a point where it is just moved out of engagement with the under side of the lever H to the point where it moves said lever and arrests the spool.

By employing devices for arresting the spool when an exposure is wound forward we are enabled to dispense with brakes or devices for keeping the film under tension, as when the spool is arrested the film can be drawn taut over the support D by a continued movement of the winding-reel, the pawl and ratchet on the latter holding the film during exposure.

In using our improved roller-holder the operator places the spool of film in position, as usual, moving the slide to the left for the purpose, passes it over the support D and attaches the end to the reel E, then sets his measuring-wheel so that the marks will come in proper position on the back of the film, and the gear P will operate the spool-arresting pawl. After making his first exposure he presses arbor Q inward, releasing the pawl H, and then winds forward a new exposure, the paper being marked and the spool being arrested at the proper time, holding the end of the film so that it may be strained over the support and the exposure made, as before.

In addition to the film-straining devices herein described, it is obvious that the devices ordinarily used for giving tension to the film could be employed; but in holders in which there are no rollers at the ends of the film-support it is desirable to draw the film forward without a great amount of friction, and then to strain it just before the exposure is made.

We do not claim herein, broadly, devices for automatically arresting the supply-spool of a roller-holder when a measured amount of film is reeled forward, as this is not of our invention.

We claim as our invention—

1. In a roller-holder for photographic films, the combination, with a film-containing spool, of a measuring-wheel having a film-marker thereon, and a spring for holding said wheel in contact with the film on the spool, substantially as described.

2. In a roller-holder for photographic films, the combination, with a film-containing roll or spool, a toothed wheel connected thereto, and a detent adapted to engage said wheel, of a measuring-wheel, the gear operated thereby having the projection operating the detent positively in a direction to cause the locking of the supply-spool, substantially as described.

3. The combination, with a film-containing spool, a toothed wheel connected therewith, and a detent, of a measuring-wheel, a wheel operated therefrom having a projection arranged to engage the detent and cause it to arrest the spool, and means for disengaging said projection and detent, substantially as described.

4. The combination, with a film-containing roller or spool, a toothed wheel connected therewith, and a detent, of a measuring-wheel, a wheel operated therefrom having a projection arranged to engage the detent and cause it to arrest the spool, means for moving the projection out of engagement with the detent, and a spring for returning it to normal position, substantially as described.

5. The combination, with a film-containing roll or spool, a toothed wheel connected therewith, and a detent, of a measuring-wheel, a wheel operated therefrom having a projection adapted to engage the detent, a longitudinally-movable arbor on which the wheel is mounted, and a spring for moving said arbor in one direction, substantially as described.

6. The combination, with the casing, a film-containing roll or spool, a toothed wheel connected therewith, and a detent, of a measuring-wheel, a wheel operated therefrom having a projection adapted to engage the detent and cause it to lock the spool, and means for disengaging said detent and projection operated from the exterior of the casing, substantially as described.

7. The combination, with the film-containing roll or spool, a toothed wheel connected therewith, and a detent, of a slide, a measuring-wheel thereon, and connections between said measuring-wheel and detent for causing the latter to engage the wheel on the spool at certain times, substantially as described.

8. The combination, with the film-containing roll or spool, a toothed wheel connected therewith, and a detent, of a slide, a marking and measuring wheel thereon, and connections between said wheel and the detent for causing the latter to engage the wheel on the spool at certain times, substantially as described.

9. The combination, with casing having the slot and the film-containing spool, of the slide embodying the two plates and the block, the spring operating it toward the roller, and a measuring-wheel having a marking device mounted on the slide, substantially as described.

10. The combination, with the film-containing roller having the toothed wheel and a detent, of the slide having the stud, the measuring-wheel mounted on the stud having the pinion connected thereto, the arbor, the spring for operating it in one direction, the gear meshing with the pinion having the projection co-operating with the detent, and the spring for moving the slide, substantially as described.

11. The combination, with the film-containing roller having the toothed wheel and a detent, of the measuring-wheel, the pinion connected thereto, the gear, the disk and projection thereon, and means for moving the said gear laterally, substantially as described.

12. The combination, with a film-containing roller, and a detent engaging the same for arresting its rotation, of a measuring-wheel and a cam projection operated thereby, engaging the detent and operating it positively in a direction to engage the film-roller and cause its arrest, substantially as described.

13. The combination, with a film-containing roller, and a detent engaging the same for arresting its rotation, of a measuring-wheel and a cam projection operated thereby, engaging the detent and operating it positively in a direction to engage the film-roller and cause its arrest, and means for disengaging the detent and cam, substantially as described.

14. The combination, with a winding-reel and device for preventing its backward rotation, of a supply-spool, a detent for engaging the spool, a measuring-wheel, and a cam projection operated thereby engaging the detent and moving it in a direction to positively engage and lock the supply-spool, said cam projection being movable laterally of the detent-actuating arm to release the latter, substantially as described.

15. The combination, with a roller operated by the movement of the film, and a measuring-wheel also operated by the film, of a detent for arresting the first-mentioned roller, and a cam projection operated by the measuring-wheel, arranged to move the detent into positive engagement with the first mentioned roller, substantially as described.

16. The combination, with the film-spool and a detent for arresting it, of a slide or carriage, a wheel mounted thereon operated by the movement of the film, and a cam projection operated by the wheel for causing the operation of the detent, substantially as described.

17. The combination, with a film-containing spool, of a measuring-wheel and an ink-marker operated thereby for marking the film while on the spool, substantially as described.

18. The combination, with a film-containing spool and a detent for arresting it, of a slide or carriage, a measuring-wheel thereon, a marker on the wheel, and a cam projection operated by the marking-wheel for moving the detent, substantially as described.

19. The combination, with a film-winding reel and devices for preventing its backward rotation, of a film-containing spool, a detent for engaging it and arresting its rotation, a measuring-wheel and connections between it and the detent, embodying a cam projection for engaging and causing the positive operation of the latter in a direction to cause the arrest of the film-spool, substantially as described.

GEO. EASTMAN.
PHILIP H. YAWMAN.

Witnesses:
FRED F. CHURCH,
S. E. TRUE.